Nov. 19, 1929.   W. TOWNSEND   1,736,060
SIGNAL APPARATUS FOR MOTOR VEHICLES
Filed June 7, 1928   2 Sheets-Sheet 1

INVENTOR.
W. Townsend
BY J. Edward Maybee
ATTY

Nov. 19, 1929. W. TOWNSEND 1,736,060
SIGNAL APPARATUS FOR MOTOR VEHICLES
Filed June 7, 1928 2 Sheets-Sheet 2
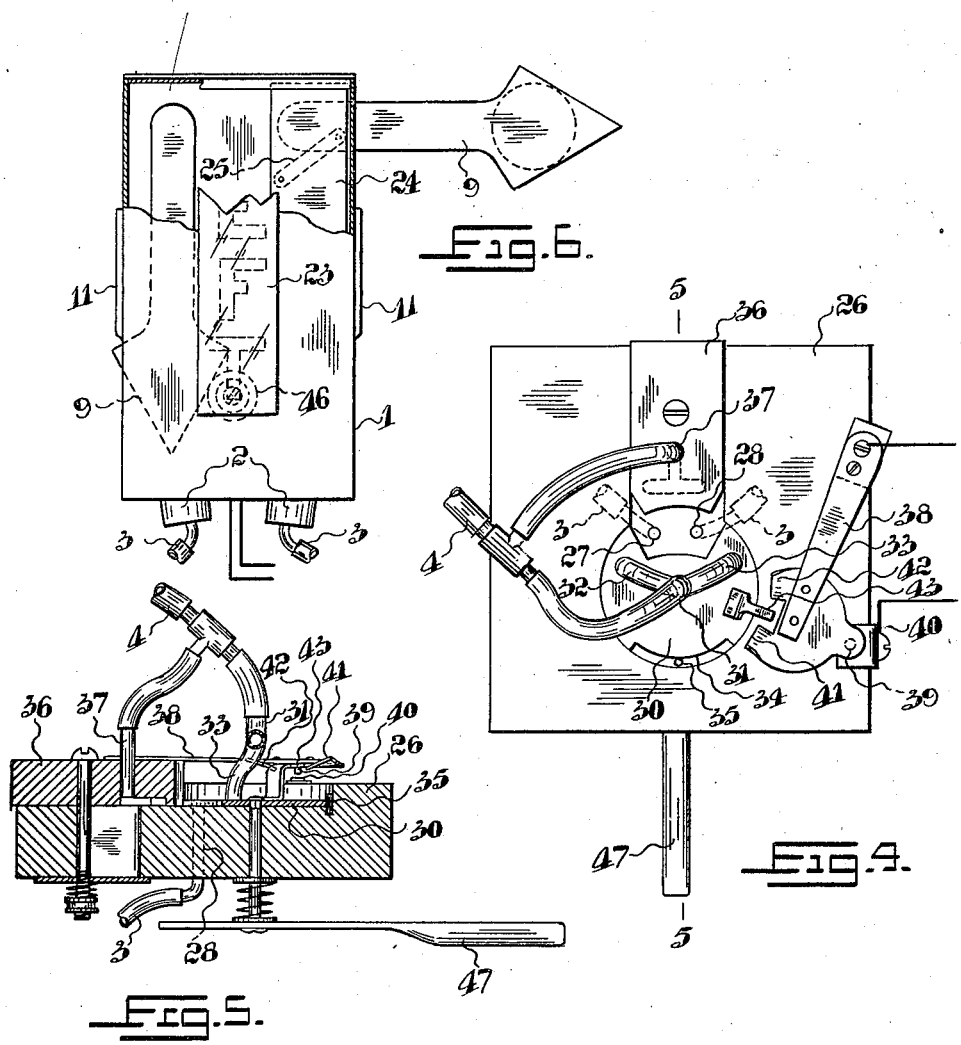
INVENTOR.
W. Townsend
BY J. Edward Maybee
ATTY.

Patented Nov. 19, 1929

1,736,060

UNITED STATES PATENT OFFICE

WILLIAM TOWNSEND, OF TORONTO, ONTARIO, CANADA

SIGNAL APPARATUS FOR MOTOR VEHICLES

Application filed June 7, 1928, Serial No. 283,513, and in Canada June 6, 1927.

This invention relates to signalling apparatus for motor vehicles and the like, which apparatus is designed to give indication to the rear of the driver's intention to stop or to turn to the right or left, and which is also adapted to give indication to the front of the driver's intention to turn to the left.

My object is to devise apparatus of this type which is preferably actuated by means of suction through a connection with the intake manifold of the engine, which is of simple construction, occupies but little space, which will be reliable in operation, which will give a conspicuous signal both by daylight and dark, and which will also give an audible signal to call attention to an impending change in the visible signal.

Figure 1:
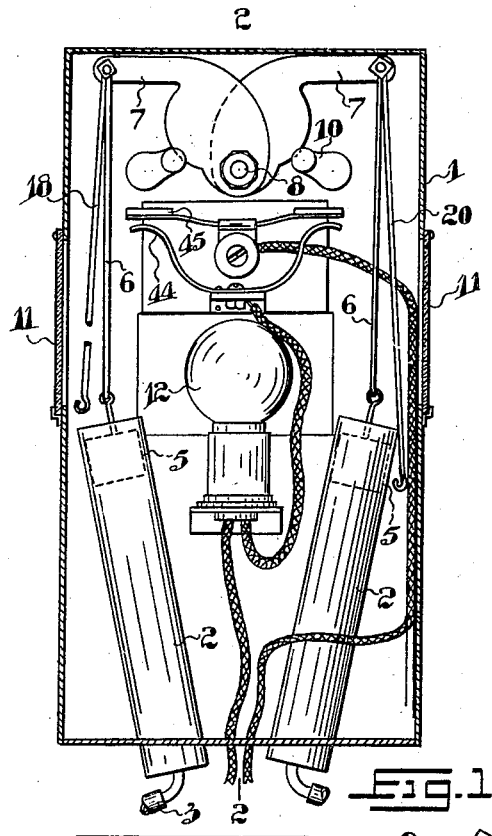
Figure 2:
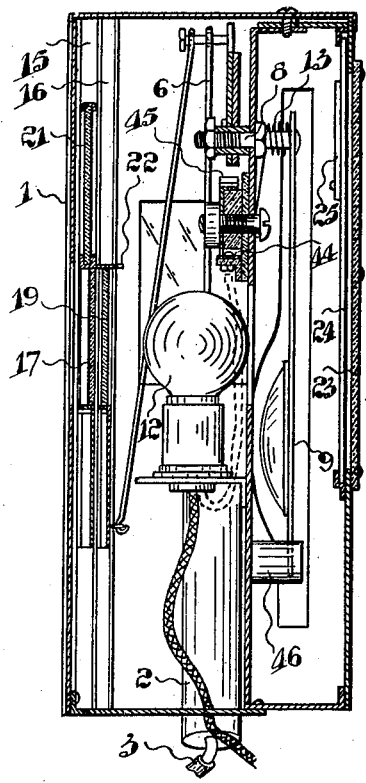
Figure 3:
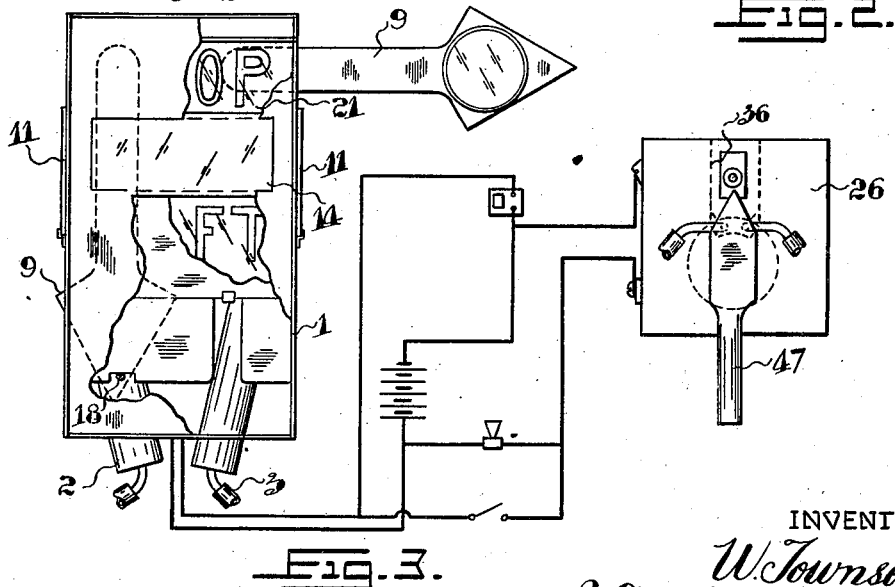

I attain my object by means of the constructions hereinafter described and illustrated in the accompanying drawings in which Fig. 1 is a vertical section through my improved signal;

Fig. 2 a vertical section taken on the line 2—2 in Fig. 1;

Fig. 3 a rear view, partly broken away, of my signal, together with a diagrammatic view of the horn electric circuit with which the signal co-operates;

Fig. 4 a plan view of the control means;

Fig. 5 a section on the line 5—5 in Fig. 4; and

Fig. 6 a front view of the signal, with one pointer raised.

In the drawings like numerals of reference indicate corresponding parts in the different figures.

1 is a suitable casing, preferably rectangular in form, adapted to be mounted in any suitable manner in a convenient position on a motor car where it may be observed from the rear and front, such for example as on the rear left mudguard.

In this casing are mounted a pair of cylinders 2. The lower ends of these cylinders communicate by means of conduits 3 with a control device, preferably located on the steering column of the vehicle, which control device communicates by means of a conduit 4 with the intake manifold of the engine.

The control device will be hereinafter described in detail.

Within each cylinder is located a piston 5. Each piston is provided with a connecting rod 6 extending through the upper end of the cylinder and connected to one end of a lever 7. These levers have their other ends pivoted on a common pin 8.

Pivoted within the casing are a pair of pointers 9, normally adapted to occupy a position wholly within the casing, but adapted when rocked to extend outside thereof, the casing being provided with openings in its side for this purpose. The pivot pins of these pointers are each provided with a crank arm 10, each positioned in the path of a lever 7. It will be apparent therefore, if communication be established between the intake manifold and the cylinder which controls the right hand pointer, that the said pointer will be raised to indicate that the driver intends to make a right turn. Similarly, if communication is established between the intake manifold and the cylinder which controls the left hand pointer, said left hand pointer will be raised to indicate an impending turn to the left. Further, if communication is established between the intake manifold and both cylinders, both pointers will be raised, which will denote the driver's intention to stop.

While the pointers may be of any suitable material and shape, I preferably coat their surfaces with a reflecting material, or provide thereon a suitable glass having a jewel cutting, which is adapted to reflect the light from the headlights of a following vehicle.

Preferably, however, I provide glazed openings 11 in opposite sides of the casing, through which light rays from an incandescent lamp 12 within the casing may pass to illuminate the pointers when in raised position.

To facilitate a quick return of the pointers to down position when communication with the intake manifold is shut off, I provide on each of the pivots for the pointers a coiled spring 13, one end of which is connected with the pointer and the other with a stationary part of the apparatus. When one of the pointers is raised, its spring is brought under tension. The spring thus tends to return the pointer to down position when the piston is released through the breaking of communication with the intake manifold. A bumper 46 of resilient material is provided against which the pointers may strike.

I prefer to combine with the apparatus described the additional signal mechanism I will now describe. In the front of the casing is provided an opening 14 in front of the lamp 12. On the sides of the casing are formed pairs of guideways 15 and 16. In the guideway 15 is vertically slidable an indicator 17, which is connected by means of a connecting rod 18 with the lever 7, which operates the left hand pointer 9. In the guideway 16 is vertically slidable an indicator 19, which is connected by means of a connecting rod 20 with the lever 7 which operates the right hand pointer 6. Each indicator has a transparent portion, the indicator 17 having its transparent portion imprinted with the word "Right" on the back thereof. The transparent portion of the indicator 17 is preferably of a material such as white celluloid, which is not transparent except when illuminated from behind. The transparent portion of the indicator 19 is preferably of green glass and has the word "Left" on its front surface. When the pointers are down the transparent green portion of the indicator 19 is directly behind the transparent portion of the indicator 17, so that even though the lamp 12 be illuminated, insufficient light will pass through the transparent portion of the indicator 17 to make the "Right" distinguishable, or in other words, the green "Left" indication acts as a shield for the "Right" indication.

In the case of a right turn signal, the lowering of the right lever 7 through the connecting rod 20 causes the indicator 19 to be lowered, moving the green "Left" transparency out of alinement with the "Right" transparency, thus letting sufficient light pass through the latter to make the word "Right" distinguishable.

In the case of a left turn signal, the lowering of the left lever 7, through the connecting rod 18, lowers the indicator 17, thus exposing the green "Left" transparency.

Also slidable in the guide 15 is a stop indicator 21. This is formed as a metal frame carying a red glass having the word "Stop" thereon. This guide is provided at its lower edge with a tongue 22 which extends into the path of the "Left" indicator 19. Thus when a "Right" signal is given and the right indicator 17 drops, the left indicator thus holds the stop indicator 21 in its upper position.

Upon the actuation of both pointers to indicate "Stop", both indicators 17 and 19 are moved downwardly, and the "Stop" indicator 21 is thus free to drop in front of the opening 14 in the casing to expose the word "Stop".

It will thus be seen that in each case a double signal is given, one by means of the pointers and the other by means of the transparent indicators which are illuminated by the lamp.

The apparatus heretofore described is intended for giving a signal to the driver of a following vehicle, although the pointers are also adapted to give indication to the driver of an approaching vehicle. I prefer, however, to provide an opening in the rear of the casing which is closed by a glass 23 having the word "Left" thereon and positioned to be illuminated by the lamp 12. Behind this glass 23 is slidably mounted a shield 24, which normally lies behind the glass 23 and is connected by means of a connecting rod 25 with the "Left" pointer 9. When this "Left" pointer is raised, the shield 24 will be moved out of alinement with the glass 23. As in this country where the common practice is for vehicles to keep to the right when passing other vehicles, the approaching driver is only concerned when the vehicle to which the device is applied intends to turn to the left and thus cross his path, and it is not necessary that any indication be given him of the intention to make a right turn.

For controlling communication between the cylinders and the intake manifold, I provide the control mechanism illustrated in Figs. 4 and 5. 26 is a base or body having two passages 27 and 28 formed therethrough, each communicating with a cylinder 2.

Rotarily mounted in a suitable seat 29 in the body is a valve member 30 having thereon a tubular portion 31 adapted to communicate with the intake manifold of the engine, and two branches 32 and 33. These branches are arranged so that by rotating the valve member in one direction the branch 32 may be brought into alinement with the passage 27, while by rotating the valve member in the opposite direction the branch 33 may be brought into alinement with the passage 28, thus bringing into operation the desired set of signals. The periphery of the valve member is notched at 34 and a pin or stop 35 provided to limit the movement of said member.

In order to operate both sets of signals together to give a stop signal, I provide the sliding valve member 36, which has a passage 37 therethrough, one end of which is adapted to communicate with the intake manifold. This passage is forked at the other end, the parts being adapted to simultaneously communicate with the passages 27 and 28. The valve member 30 is notched to receive the nose of the valve member 36, so that by sliding the latter into the notch the member 30 is held from rotation. A suitable handle 47 is provided for operating the valve member 30.

It is desirable also to give an audible signal when a change in the visible signal is to be made. I therefore provide means for giving a short "toot" of the horn when a right or left turn signal is to be made, and I use the valve member 30 to accomplish this end.

Mounted on the body 26 is a spring arm 38 carrying a contact 39 which may be suitably grounded. On the body is a contact 40 connected with a suitable source of current supply. Carried by the spring arm 38 are opposed cam members 41 and 42, adapted to be engaged by a tongue 43 on the valve member 30. When the latter is rotated to give a left turn, the tongue 43 will engage the cam 41 and rock the spring arm 38 to engage the contacts to complete the horn circuit while, when the valve member 30 is rotated to the right, the tongue 43 will engage the cam 42 to rock the spring arm to engage the contacts to complete the horn circuit.

While the lamp 12 may be continuously illuminated, I prefer, however, that it only be illuminated when a signal is being given.

I therefore provide pairs of electrical contact members, each pair comprising a stationary contact 44 and a movable contact 45. The movable contacts are positioned in the path of the crank arms 10, so that when the latter are actuated through the operation of the pointers, the lamp circuit will be closed to illuminate the signal.

What I claim is:

1. In signalling apparatus, the combination of a casing; a pair of pointers; means for actuating said pointers independently or simultaneously; a pair of indicators slidably mounted in said casing and normally in indicating position, each of said indicators being adapted to be actuated simultaneously with a pointer; and a third indicator slidably mounted in the casing, said third indicator being adapted to be held out of indicating position by either of said other indicators, but adapted to move into indicating position when said pair of indicators are both moved out of indicating position.

2. In signalling apparatus, the combination of a casing having an indicating opening therein; a pair of pointers pivoted on said casing; means for actuating said pointers independently or simultaneously; a pair of indicators vertically slidable side by side in said casing and normally positioned behind said opening, each of said indicators being connected with a pointer whereby it is actuated simultaneously therewith; and a third indicator normally supported by one of said other indicators, said last mentioned indicator having a tongue thereon extending over the other of the pair of indicators whereby it is supported when the indicator below it is moved from indicating position.

3. In signalling apparatus, the combination of a casing having an indicating opening therein; a pair of pointers pivoted on said casing; means for actuating said pointers independently or simultaneously; a pair of indicators vertically slidable side by side in said casing and having a transparent portion normally positioned behind said opening, each of said indicators being connected with a pointer whereby it is actuated simultaneously therewith; a third indicator normally supported by one of said other indicators, said last mentioned indicator having a tongue thereon extending over the other of the pair of indicators whereby it is supported when the indicator below it is moved from indicating position; and means for illuminating the interior of said casing.

Signed at Toronto, Canada, this thirtieth day of May, 1928.

WILLIAM TOWNSEND.